United States Patent
Olland

[11] 3,787,659
[45] Jan. 22, 1974

[54] APPARATUS FOR SUPPLYING EITHER HOT OR WARM WATER IN A VENDING MACHINE

[75] Inventor: Frederik Walraven Olland, Bilthoven, Netherlands

[73] Assignee: Olland Industrie-en Handelmaatschoppij N.V., DeBilt, Netherlands

[22] Filed: Jan. 12, 1972

[21] Appl. No.: 217,101

[30] Foreign Application Priority Data
Aug. 17, 1971 Netherlands .................. 7111342

[52] U.S. Cl. ................. 219/314, 99/281, 99/288, 219/306, 219/312, 219/316, 219/331, 222/146 HE
[51] Int. Cl. ................. H05b 1/00, F24h 1/20
[58] Field of Search ... 219/306, 310, 312, 314, 316, 219/331; 99/281, 282, 288; 222/146 R, 146 HE, 146 H

[56] References Cited
UNITED STATES PATENTS

| | | | |
|---|---|---|---|
| 2,742,560 | 4/1956 | Liebhafsky | 219/314 UX |
| 2,643,322 | 6/1953 | Lime et al. | 219/314 |
| 2,804,534 | 8/1957 | Coates | 219/314 |
| 3,502,843 | 3/1970 | Stryer | 219/312 |
| 1,047,389 | 12/1912 | Cooper | 219/314 |

FOREIGN PATENTS OR APPLICATIONS

| | | | |
|---|---|---|---|
| 1,341,893 | 9/1963 | France | 219/314 |
| 346,814 | 4/1931 | Great Britain | 219/314 |
| 911,840 | 4/1946 | France | 219/314 |
| 203,649 | 8/1938 | Switzerland | 219/314 |
| 521,381 | 5/1940 | Great Britain | 219/314 |

*Primary Examiner*—A. Bartis
*Attorney, Agent, or Firm*—Marshall & Yeasting

[57] ABSTRACT

A machine for vending warm drinks selectively (*a*) by extracting extractable ingredients and (*b*) by dissolving soluble ingredients comprises an apparatus for supplying both hot water for extracting and warm water for dissolving. A tank for holding a supply of warm water is separated from a substantially smaller second tank for holding a supply of hot water by a heat-conducting wall. An electrical heating coil in the second tank is provided with a thermostatic control responsive to the water temperature in the second tank for maintaining said water temperature slightly below the boiling point. Means are provided for maintaining the transfer of heat from the second tank to the first tank at rate such as to maintain a water temperature of 70°–75° C. in the first tank when the water temperature in the second tank is slightly below the boiling point. A valve-controlled outlet is provided for withdrawing hot water from the second tank for extracting, and a separate valve-controlled outlet is provided for withdrawing warm water from the first tank for dissolving.

4 Claims, 7 Drawing Figures

APPARATUS FOR SUPPLYING EITHER HOT OR WARM WATER IN A VENDING MACHINE

BACKGROUND OF THE INVENTION

This invention relates to a boiler to be mounted in a vending machine for delivery of warm drinks prepared by contacting on the one hand extractable main ingredients (ground coffee, tea leaves, etc.), and on the other hand soluble main ingredients (instant coffee, cocoa, etc.), in each case with water at a suitable temperature, to which soluble sub-ingredients (milk and/or sugar in powdered form) may be added, comprising a water tank having therein a float and a heating element for heating the water to a temperature adjustable by a thermostat, and valve-controlled outlet openings through which a metered quantity of water of the desired temperature can be tapped for contacting with the extractable or soluble main ingredients and additives, if any.

The vending machines presently known which are adapted for the delivery of warm drinks, can be divided into two categories, the first consisting of vending machines in which the main ingredients, such as coffee, cocoa (or soup), are metered in powdered form and are dissolved in warm water, adding thereto, if any, likewise soluble sub-ingredients, such as powdered milk and/or sugar.

In the other category of vending machines the main ingredients are constituted by extractable substances, such as freshly ground coffee or fresh tea leaves to brew therefrom filter coffee or tea, adding thereto, if any, the aforementioned sub-ingredients.

For preparing the first category of drinks, the temperature of the water must be such that the drinks thus prepared are suitable for instant consumption. To this end the water in the boiler should be heated to a temperature ranging from 70° to 75° C.

In the second category of drinks the extracting effect comes to the fore. Both for brewing filter coffee and for drawing tea leaves hot water is required at a temperature ranging from 95° to 97°C.

On account of these totally different requirements with respect to the temperature of the water to be used, it was sofar not possible to obtain water both for filter coffee and instant coffee from one and the same boiler. Trials to prepare filter coffee with water at the same temperature as the water used for preparing instant drinks, produced a wishy-washy brewage. On the other hand preparing all drinks with hot water has the disadvantage that the instant drinks are delivered at a too high temperature which could procure a painful surprise for the consumer, whereas especially in the event that milk powder is added to a drink thus prepared, the hot water would cause curdling of the milk.

SUMMARY OF THE INVENTION

The invention has for its object to provide a versatile boiler such that water for both categories of drinks can be supplied by one and the same boiler. To this end the boiler according to the invention is characterized in that the water tank is divided into a small compartment and a large compartment by means of a baffle projecting above the water level, the heating element being arranged wholly or partly in the small compartment. In this way it is possible to heat the water in the small compartment to about its boiling point. A part of this heat dissipates via the baffle to the water in the large compartment which, in turn, cedes its heat to the ambient atmosphere. In this way a temperature balance can be adjusted in which the water in the large compartment reaches a temperature between 70° and 75°C. If too little heat is discharged from the small compartment to the large compartment, part of the heating element is extended within the large compartment. So hot water can be delivered by the small compartment and warm water by the large compartment, both at the required temperature.

The heat transfer between the small and the large compartments is based upon conduction (via the baffle to the walls enclosing the large compartment) and upon convection in the large compartment. In order to promote this latter type of heat transfer, being the principal one, and in accordance with a further feature of this invention, the element and also the baffle extend to nearly the bottom of the tank.

Another feature of the invention resides in the fact that both compartments are communicating via their lower area. An additional advantage of this construction in which the compartments are communicating, is that the supply of cold water can be controlled by means of one inlet opening and one float, whereby the heating element can be accommodated exclusively in the small compartment.

A further improvement of the heat transfer by convection can be achieved by shaping the baffle as a separately defined body surrounding the water in the small compartment and which itself is surrounded by the water in the large compartment.

The structure of the baffle as an independent body is also advantageous from a constructive point of view since it permits the body to be suspended free from the bottom of the tank by hanging the body with its outlet opening provided in the side wall thereof around the nipple of a discharge pipe, said nipple being inserted through a corresponding outlet opening in the side wall of the tank, and extending within the water tank.

Under certain circumstances too much heat may be withdrawn from the small compartment. In that case and according to a further feature of the invention the small compartment is covered over the upper part of its height with heat-insulating means.

In a practical embodiment the body is formed as a tube over the upper part of which the heat-insulating means are provided.

According to a further characteristic a vent tube is connected with each discharge pipe whereby one of these vent tubes opens in the water tank above the water level therein and acts as overflow, means being provided for collecting the overflow water which operates a relay that stops the feeding of cold water.

The invention is also concerned with a vending machine having mounted therein a boiler as disclosed herein.

DESCRIPTION OF THE PREFERRED EMBODIMENTS

Figure 1A:
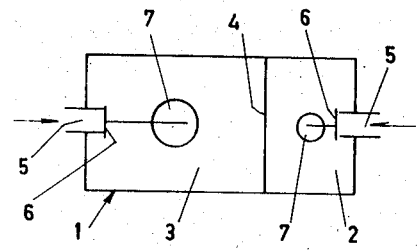
FIG. 1A schematically shows a plan view of a first embodiment of the boiler according to the invention.
Figure 1B:
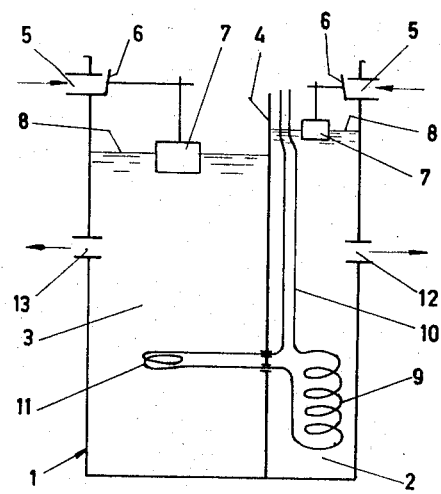
FIG. 1B is a diagrammatic vertical section of the embodiment shown in FIG. 1A.

In FIGS. 1A and 1B is schematically represented a boiler thereof in which the principle of the invention is disclosed. The boiler comprises a water tank 1, the volume of which is divided into a small compartment 2 and a large compartment 3 by means of a baffle 4, completely separating both compartments from each other, so that each has its own supply 5 for cold water and a float 7 cooperating with a valve 6 for maintaining a water level 8 within the water tank 1. In the small compartment 2 is arranged a heating element 10 composed of a number of spiral windings 9, a single winding 11 thereof extending within the large compartment 3. The capacity of the small compartment is smaller and the number of spiral windings arranged therin is larger than in the large compartment 3, so that the water in the small compartment 2 can be heated to the boiling point whereas the water in the large compartment 3 attains only a moderate temperature. In each of the compartments 2 and 3 there is a tap hole 12 and 13 respectively so that hot water can be tapped at 12 and warm water at 13.

Figure 2A:
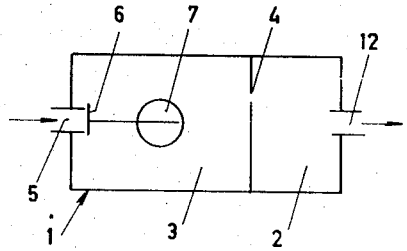
FIG. 2A shows a plan view of a second embodiment likewise schematically.
Figure 2B:
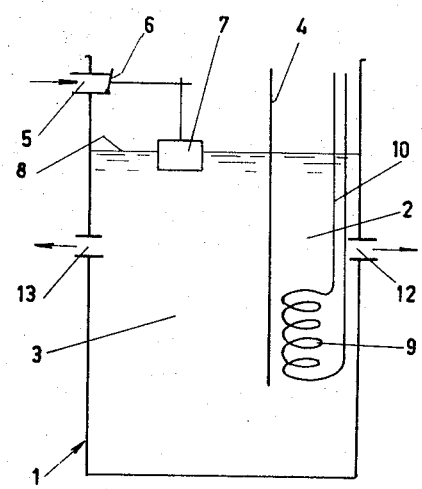
FIG. 2B is a diagrammatic vertical section of the embodiment shown in FIG. 2A.

In the modified embodiment of FIGS. 2A and 2B both compartments 2 and 3 are communicating at their lower area so that one supply pipe 5, one valve 6 and one float 7 are sufficient for the operation of the whole water tank 1. Nevertheless hot water can be tapped at 12 separately and warm water at 13.

Figure 5:
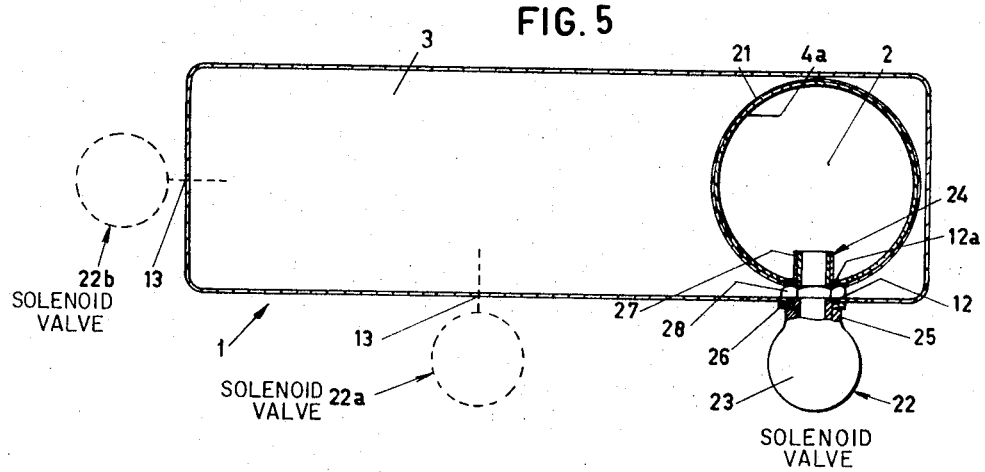
FIG. 5 shows a cross-section at somewhat enlarged scale of the water tank along the line V—V in FIG. 3.
Figure 3:
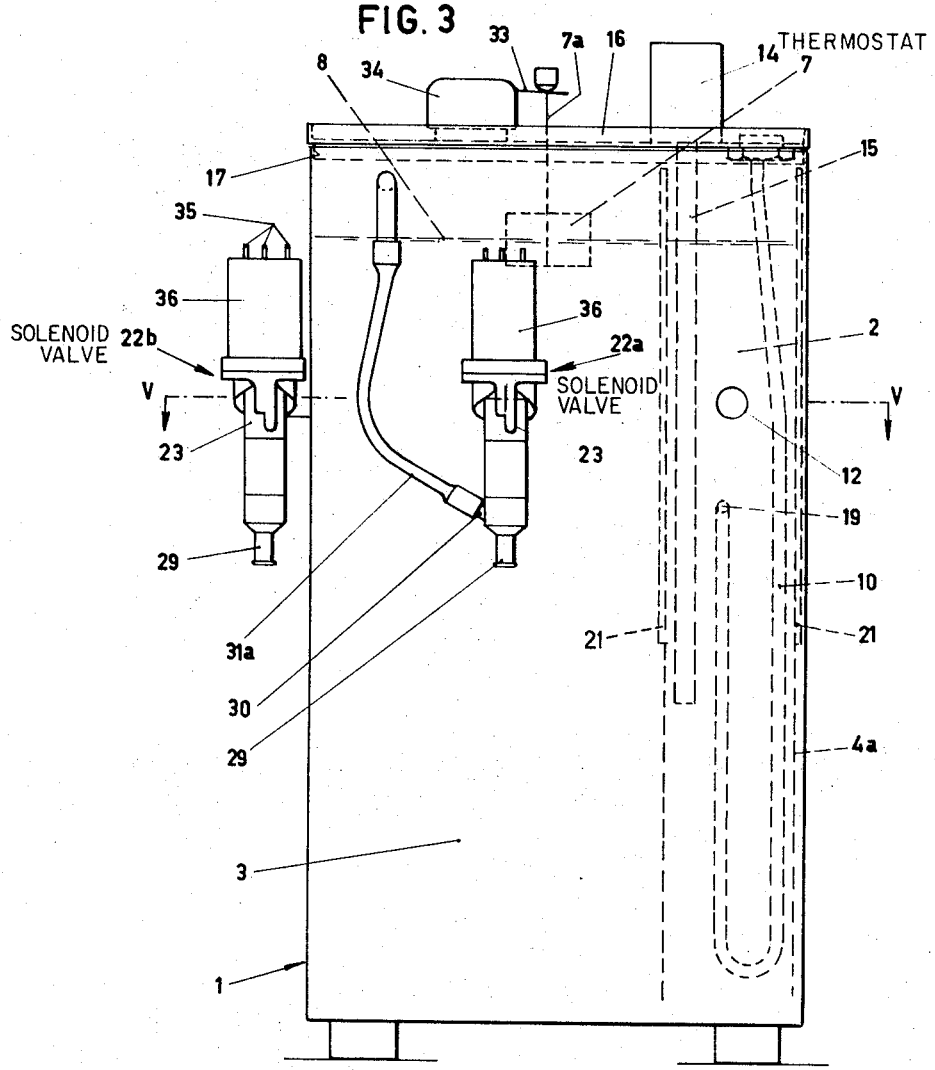
FIG. 3 shows in side elevation a modification of the second embodiment illustrating a construction which is being applied in practice.
Figure 4:
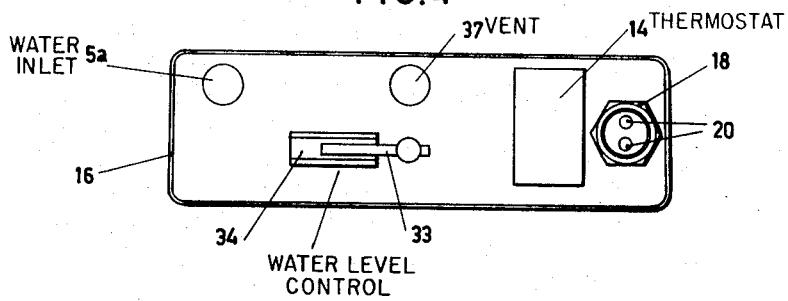
FIG. 4 shows a plan view of a cover for the boiler on which various parts of the boiler have been mounted.

In FIGS. 3–5 like parts are designated by the same reference numerals. In these figures, relating to an embodiment which has been realized in practice, are also represented the usual electrical parts of an automatically operating boiler. For example a thermostat 14 has its temperature sensor 15 reaching into the water behind the baffle which baffle is constituted here as a tubular body 4a. The thermostat 14 is mounted on a cover 16 which rests on a narrow seating edge 17. On the cover 16 there is further mounted the heating element 10 being secured by a nut 18 (FIG. 4). The heating element 10 is adapted, like the temperature sensor 15 to extend into the tube 4a and is formed as a double parallel hair pin loop with two branches joining at 19. In FIG. 4 the two current connectors of the heating element 10 which are passed through the cover 16, are indicated at 20. It will be obvious that the strongest heating of the water occurs in the lower part of the tube 4a.

The water thus heated rises upwardly and to protect this hot water from cooling a thin stainless steel jacket is disposed at a small distance from and within the upper part of the tube 4a, or a sleeve 21 of a heat insulating plastic material being resistant to a temperature of about 100°C is slid over said upper part. In the latter event the tube 4a need not be closed by a longitudinal seam but can be rolled in tubular form from a flat sheet. In this insulated part the discharge opening 12 for hot water is positioned in the wall of the tank 1, said hot water being passed through a magnetic valve 22 (see FIG. 5) toward an extracting device, not-shown, arranged outside of the boiler within the vending machine proper.

In FIG. 5 the mounting of the magnetic valve through the wall of the water tank 1 is represented in cross-section. The valve housing 23 (vide also FIG. 3) is inserted with a nipple 24 through a opening 12 in the tank wall into the interior of the tank 1. The nipple 24 has on its part outside the tank a shoulder 25, and a washer 26, for instance of copper, is provided between this shoulder and the outer surface of the tank wall. The assembly is tightened against the tank wall by means of a nut 28 screwed over the inwardly extending threaded end 27 of the nipple 24. Special sealing means or centering means are not necessary therefor. Since the tube 4a is enclosed with little clearance by three walls of the water tank 1, there is no great need for such centering or sealing.

In the large compartment 3 heating of the water present therein is to some extent effected by conduction and convection, and by a suitable choice, for example of the length of the sleeve 21, it is possible to attain in the large compartment a temperature of 70° to 75°C. This warm water destined for dissolving various main ingredients (coffee powder, cocoa powder, soup powder) and, if any, sub-ingredients (sugar- and/or milk powder) can be tapped through discharge openings 13, which are each operated by a magnetic valve 22a, 22b etc. The mounting of these valves to the water tank 1 is quite analogous to the mounting of the magnetic valve 22, discussed hereabove. From the discharge pipes 29 (FIG. 3) the warm water is passed directly to a mixing hopper, not-shown, where it is contacted with the soluble main ingredients from a metering device, in which hopper also, if any, sub-ingredients may be fed.

To the side wall of the discharge pipe 29, of the magnetic valves 22a, 22b etc. is integrally connected a stub 30 for a venting tube 31a, etc. Only the venting tube 31a also serves as an overflow and opens therefore in the space above, the water level 8 being normally controlled by the float 7. The float rod 7a is coupled with a switch arm 33 of a microswitch 34 in a circuit which controls the supply of cold water to the water tank through the opening 5a (FIG. 4) in the cover 16. When the water level 8 lowers due to consumption of hot or warm water, the float 7 drops and the contacts of the microswitch 34 and thus the circuit for supplying cold water are closed.

Also the microswitch 34 and the float 7 are advantageously mounted to the cover 16. The electrical connections, not-shown, with the terminals 35 of the coils 36 of the magnetic valves are detachable so that the cable with the electrical conductors leading from the signal exciter in the vending machine to the magnet coils, etc., can be sustained in a fixed point of the cover 16. In this cover there is also provided an opening 37 for the removal of water vapour from the tank 1 to a vapour hood, not-shown.

I claim:

1. In a machine for vending warm drinks selectively (a) by extracting extractable ingredients and (b) by dissolving soluble ingredients, an apparatus for supplying both hot water for extracting and warm water for dissolving, comprising a tank for holding a supply of warm water, a substantially smaller second tank for holding a supply of hot water which is separated from the first tank by a heat-conducting wall, an electrical heating coil in the second tank which is provided with a thermostatic control responsive to the water temperature in the second tank for maintaining said water temperature slightly below the boiling point, means for maintaining the transfer of heat from the second tank to the first tank at rate such as to maintain a water temperature of 70°–75° C in the first tank when the water temperature in the second tank is slightly below the boiling point, a valve-controlled outlet for withdrawing hot water from the second tank for extracting, and a separate valve-controlled outlet for withdrawing warm water from the first tank for dissolving.

2. An apparatus according to claim 1 wherein the second tank is in the form of a vertical tube having an open lower end spaced from the bottom of the first tank and having its upper end extending above the water level in the first tank.

3. An apparatus according to claim 2 wherein the vertical tube is supported at least in part by a nipple which forms the outlet of the second tank and which is fixed in a side wall of the first tank.

4. An apparatus according to claim 1 comprising a float-controlled inlet for supplying water to the first tank, and an auxiliary overflow line having an inlet above the water level normally maintained by the float-controlled inlet.

* * * * *

UNITED STATES PATENT OFFICE
CERTIFICATE OF CORRECTION

Patent No. 3,787,659    Dated January 22, 1974

Inventor(s) Frederik Walraven Olland

It is certified that error appears in the above-identified patent and that said Letters Patent are hereby corrected as shown below:

Column 3, after line 8, insert - -Fig. 6 shows a horizontal cross-section of a modified form of device.- -;

After line 59, insert - -21' (Fig. 6)- -;

Line 63, after "part" insert - -(Fig. 3 )- -;

Add the following claim:

5. An apparatus according to claim 2 wherein the means for maintaining the transfer of heat from the second tank to the first tank at a rate such as to maintain a water temperature of 70-75°C in the first when the water temperature in the second tank is slightly below the boiling point is a stainless steel jacket disposed within the upper part of the vertical tube and spaced a small distance therefrom.

UNITED STATES PATENT OFFICE
CERTIFICATE OF CORRECTION

Patent No. 3,787,659                                Dated  Januray 22, 1974

Inventor(s)      Frederik Walraven Olland            Page - 2

It is certified that error appears in the above-identified patent and that said Letters Patent are hereby corrected as shown below:

Insert Figure 6, as part of Letters Patent.

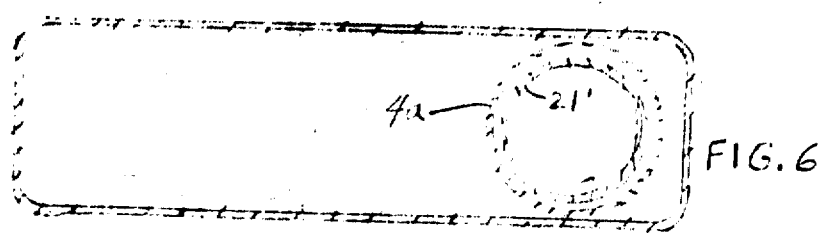

Signed and sealed this 29th day of October 1974.

(SEAL)
Attest:

McCOY M. GIBSON JR.                     C. MARSHALL DANN
Attesting Officer                       Commissioner of Patents